United States Patent
Komatsubara et al.

[11] 3,894,792
[45] July 15, 1975

[54] METHOD AND DEVICE FOR DEFLECTING LIGHT BEAM

[75] Inventors: Kiichi Komatsubara, Tokorozawa; Yasuhiro Shiraki, Hachioji; Eizaburo Yamada, Tokyo, all of Japan

[73] Assignee: Hitachi, Ltd., Japan

[22] Filed: Sept. 16, 1970

[21] Appl. No.: 72,761

[30] Foreign Application Priority Data
Sept. 26, 1969  Japan .............................. 44-76259

[52] U.S. Cl. .............................. 350/160 R; 357/30
[51] Int. Cl. .............................. G02f 1/16
[58] Field of Search ............ 350/150, 160, 175 GN; 332/7.51; 250/199; 317/235 N

[56] References Cited
UNITED STATES PATENTS

| | | | |
|---|---|---|---|
| 2,692,950 | 10/1954 | Wallace | 350/160 X |
| 2,776,367 | 1/1957 | Lehovec | 350/160 |
| 3,158,746 | 11/1964 | Lehovec | 350/160 |
| 3,238,843 | 3/1966 | Heller | 350/160 |
| 3,271,578 | 9/1966 | Bockemuehl | 350/160 |
| 3,295,911 | 1/1967 | Ashkin et al. | 350/150 |
| 3,309,162 | 3/1967 | Kosanke et al. | 350/160 |
| 3,322,485 | 5/1967 | Williams | 350/160 |
| 3,367,733 | 2/1968 | Grau | 350/160 |
| 3,409,797 | 5/1968 | Ross | 350/160 X |
| 3,461,402 | 8/1969 | Dumanchin | 350/160 X |

FOREIGN PATENTS OR APPLICATIONS
868,275  5/1961  United Kingdom ............... 350/160

Primary Examiner—Edward S. Bauer
Attorney, Agent, or Firm—Craig & Antonelli

[57] ABSTRACT

A pn junction layer is formed in a semiconductor body having a forbidden band the width of which is greater than the photon energy of an irradiated light beam. The pn junction is forwardly biased through transparent electrodes provided on the opposite principal surfaces to inject carriers at a concentration of the order of $10^{18}$ to $10^{22}$ cm$^{-3}$. The refractive index of the semiconductor body is varied according to the carrier concentration to arbitrarily deflect the incident light beam.

7 Claims, 11 Drawing Figures

INVENTORS
KIICHI KOMATSUBARA,
YASUHIRO SHIRAKI AND
EIZABURO YAMADA
BY Craig, Antonelli, Stewart & Hill
ATTORNEYS 3,894,792

SHEET 2

INVENTORS
KIICHI KOMATSUBARA,
YASUHIRO SHIRAKI AND
EIZABURO YAMADA

BY Craig, Antonelli, Stewart & Hill
ATTORNEYS

METHOD AND DEVICE FOR DEFLECTING LIGHT BEAM

This invention relates to a method of deflecting a light beam by the use of a semiconductor having a forbidden band the width of which is greater than the photon energy of the incident light beam, and to an optical device embodying this method.

In general, there are various known methods for deflecting a light beam, such as those utilizing reflection by a mirror, Bragg diffraction of water with ultrasonic waves propagating in water, and the Raman scattering of quartz etc. with ultrasonic waves propagated in the material.

According to the above methods, however, there are accompanied substantial limitations or restrictions. Namely, according to methods employing mechanical operation of a mirror, etc. a light beam cannot be deflected at high frequency and according to those employing the propagation of ultrasonic wave in water the transducer cannot be made compact.

It is well known that the refractive index n of a semiconductor for a light beam of an angular frequency $\omega$ obeys the relation $$n^2 = \epsilon(\omega) \quad (1),$$

where $\epsilon$ is the dielectric constant of the semiconductor. Further, the dielectric constant $\epsilon$ can be expressed as $$\epsilon(\omega) \approx I - \frac{4\pi N e^2}{m^* \omega^2} + \frac{4\pi \bar{n} e^2}{\mu(\omega^2 - \omega_t^2)} \quad (2),$$

where $N$: carrier concentration in the semiconductor,
$\bar{n}$: lattice point concentration of the semiconductor,
$m^*$: effective mass of a carrier in the semiconductor,
$\mu$: reduced mass of a lattice point, and
$\omega_t$: angular frequency of the lattice.

In equation (2), the second term on the right-hand side express the effect of free carriers and the third term express the effect of the crystal lattice.

Taking cadmium sulphide CdS as an example, the effective mass $m^*$ of a conduction electron is $0.2\, m_o$ ($m_o$ being the rest mass of an electron). Thus, at a normal carrier concentration, the second term effect is smaller than the third term effect in cadmium sulphide. However, for an incident beam of visible light, since the angular frequency $\omega_t$ of the lattice lies in the infra-red region, an inequality relation $$\omega_t \ll \omega$$

holds. Accordingly, for a light beam of angular frequency $\omega$, $(\omega^2 - \omega_t^2)$ can be regarded as being constant. Thus, with visible light irradiation, even if the number concentration $\bar{n}$ of free carriers can be varied to some extent, the dielectric constant $\epsilon(\omega)$ expressed as equation (2) cannot be varied apparently.

However, when carriers are excessively injected at the pn junction to a carrier concentration of $10^{18}$ to $10^{22}$ cm$^{-3}$, the second term in equation (2) becomes large so as to effectively vary the refractive index, since a variation in the refractive index $\Delta n$ due to a variation of carrier concentration $\Delta N$ can be expressed as $\Delta n \approx 10^{-20} \Delta N$. Further, an increase in free carriers due to irradiation of visible light works positively. Thus, the refractive index of a semiconductor can be varied or modulated.

For a semiconductor as described above, there are CdF$_2$, ZnS, ZnTe, etc. as well as CdS, which all have a greater forbidden band width than the photon energy of irradiated visible light. Such materials are compounds of a IIb group element (atomic number 65 to 113) and a VIb group element (atomic number 32 to 128), CdF$_2$ and SiC. The widths of the forbidden band and the conductivity types of these semiconductors are listed below.

Table

| Material | Forbidden band width (eV) | Corresponding Wavelength ($\mu$) | Conductivity Type |
|---|---|---|---|
| CdS | 2.4 | 0.52 | n |
| CdF$_2$ | 6.0 | 0.21 | n |
| ZnS | 3.7 | 0.34 | p |
| ZnTe | 2.1 | 0.59 | p |
| SiC | 2.86 | 0.44 | n,p |

For forming a pn junction in such a semiconductor body, transparent electrodes are provided on the n and p type regions to forwardly bias the semiconductor for injecting carriers at a concentration of $10^{18}$ to $10^{22}$ cm$^{-3}$. Then the refractive index of the semiconductor body for visible light beam can be modulated based on the injected carrier concentration. Accordingly, the path of a light beam transmitted through said semiconductor is deflected according to the quantity of injected carriers.

As is described above, this invention mainly relates to a method of deflecting a light beam by modulating the refractive index of a semiconductor body and aims to provide a method for deflecting a light beam in a desired direction for a desired period.

A further object of the invention is to provide an optical device embodying the above method.

According to the invention, there is provided a method of deflecting a light beam employing a semiconductor element, said semiconductor element comprising a body of a semiconductor having a forbidden band the width of which is greater than the photon energy of light to be deflected, a pn junction layer formed in said semiconductor body by doping an impurity of a different conductivity type from that of said semiconductor from one principal surface of said semiconductor body, and at least one pair of transparent electrodes formed on respective p and n type regions which form said pn junction therebetween, the method comprising simultaneous steps of directing a light beam to be deflected to pass through said semiconductor body and transparent electrodes, and forwardly biasing said pn junction in said semiconductor body through said transparent electrodes with electric power having an intensity large enough to inject carriers at a concentration of $10^{18}$ to $10^{22}$ cm$^{-3}$ to thereby effect deflection of the directed light beam.

Further, there is also provided a light beam deflecting device comprising:

a body of a semiconductor having a forbidden band the width of which is greater than the photon energy of irradiated light of a predetermined frequency, the body having at least one principal surface;

at least one pn junction formed in said semiconductor body by doping impurity of a different conductivity type from that of said semiconductor from said principal surface;

at least two transparent electrodes formed on said respective p and n type regions with said pn junction sandwiched therebetween; and means for supplying electric power to forwardly bias said pn junction through said transparent electrodes, so as to inject carriers at said pn junction at a concentration of $10^{18}$ to $10^{22}$ cm$^{-3}$.

In an embodiment of the present invention, for increasing the magnitude of deflection the concentration of injected carriers or the gradient thereof is increased, and vice versa.

As is apparent from the above, according to the present invention, a light beam incident on a semiconductor body including a pn junction is deflected or modulated according to the concentration of injected carriers; therefore, there are provided the following advantages that:

1. the quantity of modulation in the refractive index and hence that of deflection of a light beam of interest can be arbitrarily adjusted; and
2. by adjusting the injected carrier concentration at respective pn junctions formed in a semiconductor body, the modulation of the refractive index for an incident light beam and hence the deflection of the incident light beam can be adjusted accordingly, therefore an optical device having a desired property can be easily formed by properly selecting the shape of a semiconductor body and/or the disposition of pn junctions in the semiconductor body.

Now, description will be made with reference to the accompanying drawings in which:

FIG. 2b illustrates the relation of electrode positions and the applied voltages or current for the optical device shown in FIG. 2a;

FIG. 2d illustrates the manner of deflecting a light beam by the optical device of FIG. 2a;

FIG. 7b is an alternation of the embodiment of FIG. 7a.

Figure 1:
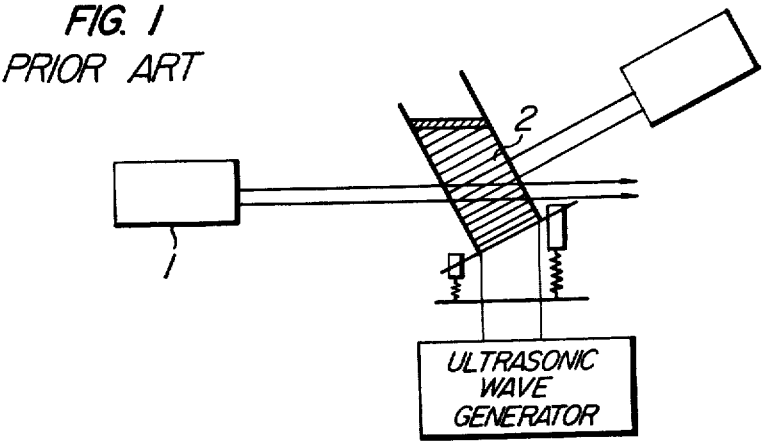
FIG. 1 is a schematic longitudinal cross section of a conventional light beam deflector.
Figure 2A:
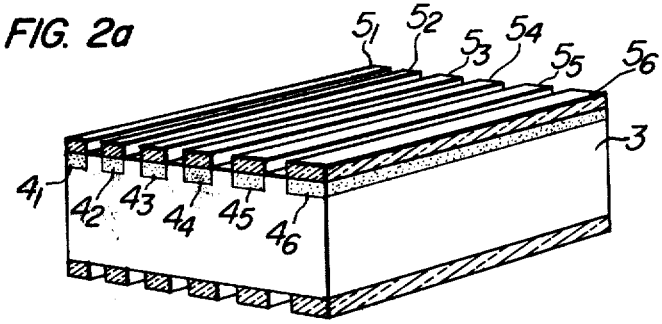
FIG. 2a is a schematic perspective of an optical device embodying the method of deflecting a light beam according to the present invention.

FIG. 2a shows an embodiment of a light beam deflecting device according to the present invention in which pn junctions are formed in a semiconductor body 3 of, for example, n conductivity type, by doping an acceptor impurity such as nitrogen ion to form p type regions $4_1, 4_2, 4_3, 4_4, 4_5$ and $4_6$. For each pn junction, a pair of transparent electrodes is formed on the p and n type regions as indicated at $5_1, 5_2, 5_3, 5_4, 5_5$ and $5_6$. There are various methods to form a pn junction, but preferably ion implantation method would be employed to accurately form a pn junction. For example, nitrogen ions are implanted into a cadmium sulphide body through a mask placed thereon, with an accelerating voltage above 10 KV, more preferably above 50 KV. In this embodiment, mutually parallel p type regions having a width of 0.5 mm with a gap of 0.5 mm are formed in a CdS body having a specific resistivity of 5 $\Omega$-cm and dimensions of 5.5 mm × 5.5 mm × 0.2 mm. On the respective electrodes, lead-out conductors are attached to connect them with power supplies.

Figure 2B:
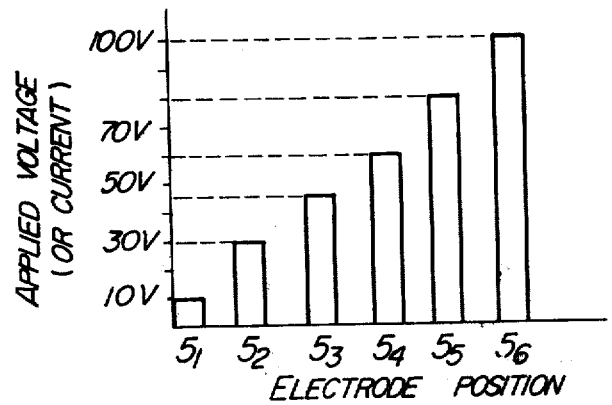

Biasing voltages of 10V, 28V, 46V, 64V, 80V, and 100V are applied through the transparent electrodes $5_1, 5_2, 5_3, 5_4, 5_5$ and $5_6$ to the respective pn junctions so as to inject carriers thereat. FIG. 2b shows the waveforms of the biasing voltages (or corresponding currents). FIG. 3 shows the resultant carrier concentration distribution. For a pn junction, the voltage-current characteristic is as is shown in FIG. 3, in which curve $a$ is the characteristic in a dark room, curve $b$ corresponds to ordinary illumination and curve $c$ is that under laser light illumination. When a biasing voltage above 2V is applied to a pn junction under illumination, a current above 20 mA is allowed to flow through the pn junction and the number of carriers begins to increase rapidly. Such a phenomenon is illustrated by the carrier concentration distribution of FIG. 2c. Namely, with a spatial variation in biasing voltage, a refractive index gradient is formed in the semiconductor body. Thus, the semiconductor body works as a kind of prism, which deflects light beams as is illustrated in FIG. 2d. In the above embodiment, if the biasing voltages are selected to be 10V for electrodes $5_1$ and $5_6$, 46V for electrodes $5_2$ and $5_4$ and 100V for electrode $5_3$, the refractive index changes from the edges to the center in the semiconductor body, and the resultant spatial variation of the optical path makes the semiconductor body act as a cylindrical convex lens. For example, parallel light beams of a wavelength 5000A focus on a line 10 cm after the exit pupil of this refractive index modulated element.

Figure 2C:
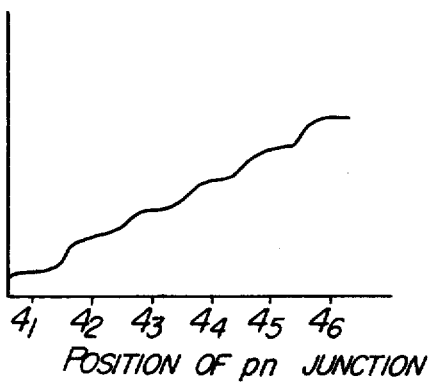
FIG. 2c illustrates the distribution of the carrier concentration in the device of FIG. 2a applied with voltages of FIG. 2b.
Figure 2D:
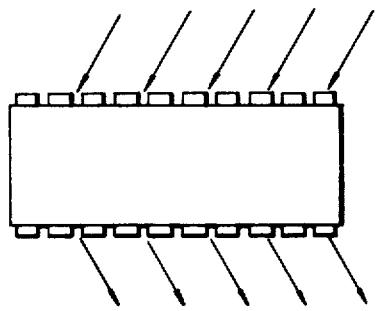
Figure 3:
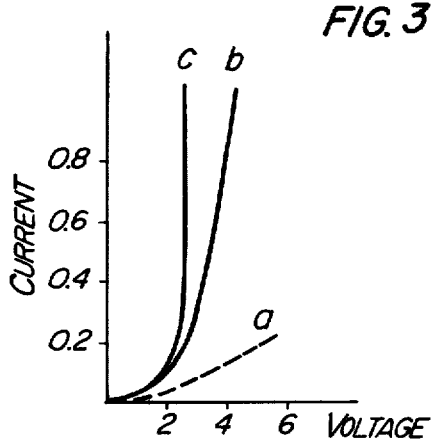
FIG. 3 shows current intensity curves of a pn junction with respect to the applied voltage in the optical device of this invention.

Further, stepped carrier concentration distribution such as shown in FIG. 2c causes quantum noise in transmitted light beams. Therefore, the spacing of adjacent electrodes (or pn junctions) is preferably made as small as possible.

Figure 5:
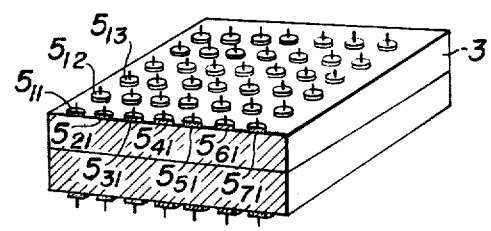
FIG. 5 is a schematic perspective of another embodiment of an optical device according to the present method.
Figure 4:
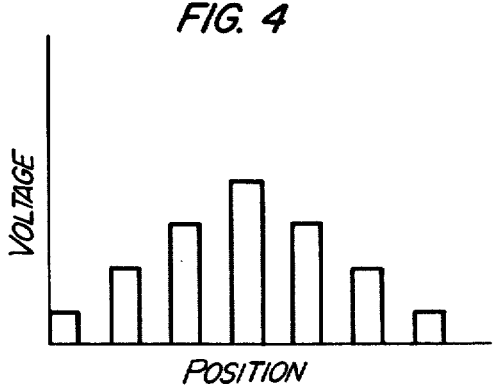
FIG. 4 shows the relation of electrode positions and the applied voltages for an optical device having a lens function according to the present method.

FIG. 5 shows a matrix-form configuration of pn junctions. With matrix-form disposition of pn junctions and corresponding electrodes $5_{11}, 5_{12}, 5_{13}, \ldots, 5_{21}, 5_{22}, \ldots, 5_{31}, 5_{32}, \ldots$, application of a two-dimensional voltage profile focuses, disperse or change the pattern of irradiated light beams.

Figure 6:
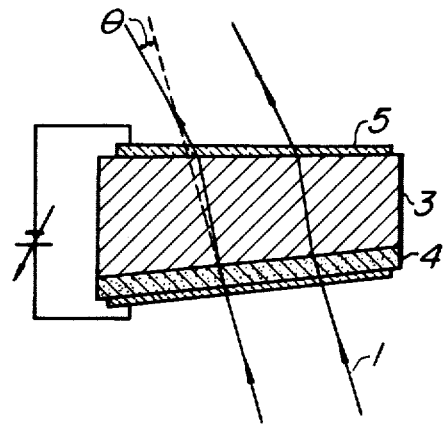
FIG. 6 is a longitudinal cross section of another embodiment of the invention.

When a CdS body 3 is shaped to have two principal surfaces slanting towards each other as is shown in FIG. 6, it can function similar to a variable prism. In the n type CdS body, a pn junction is formed by doping an acceptor impurity to form a p type region 4 and transparent electrodes 5 are formed on said two principal surfaces to forwardly bias the pn junction. The deflecting angle of transmitting light beam 4 can be controlled by controlling the injected current density, and hence the refractive index. With a change of about 4V in the biasing voltage, the direction of a light beam 1 could be changed about 5°.

Figure 7A:
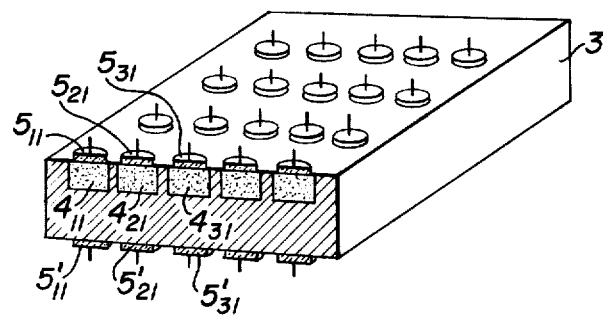
FIG. 7a is a schematic perspective of another embodiment of the invention.
Figure 7B:
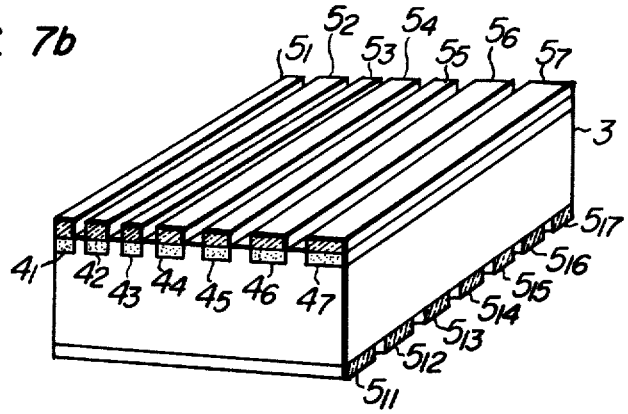

When, as is shown in FIG. 7a, nitrogen ions are implanted into an n-type CdS body 3 by means of an ion-implantation method, so as to form a plurality of cylindrical p-type regions in matrix form, dot-shaped pn junctions $4_{11}, \ldots 4_{12}, \ldots$ may be obtained. Furthermore, transparent electrodes $5_{11}, \ldots 5_{21}, \ldots$ and $5'_{11}, \ldots 5'_{21}, \ldots$ are disposed opposite to each other on the p and n type regions with the pn junctions sandwiched therebetween. In this arrangement, when carriers are injected at a concentration of $10^{18}$ to $10^{22}$ cm$^{-3}$ through the respective transparent electrodes into the respective pn junctions, respective light beams transmitted through the respective pn junctions can be deflected in accordance with the concentration of an injected carriers.

Further, in place of the structure of FIG. 7a, stripe-shaped pn junctions $4_1, 4_2, \ldots 4_7$ may be formed in a semiconductor body, and two groups of mutually parallel stripe-shaped transparent electrodes $5_1, 5_2, \ldots 5_7$ and $5_{11}, 5_{12}, \ldots, 5_{17}$ may be formed on the respective principal surfaces of the semiconductor in mutually crossed fashion.

Further, this invention can be also applied in the following way. A pn junction is formed in a semiconductor body having two parallel principal surfaces and transparent electrodes are formed on both principal surfaces. It will be apparent that the optical path in the semiconductor body or the wavelength of an incident light beam can be varied by modulating the refractive index of the semiconductor. When the optical path between the two principal surfaces becomes an integral or a half integral of the wavelength of the incident light beam, there occurs an interference. Then, the hue of the transmitted light beam changes. If the incident light beam is monochromatic, such an element can shut off the light beam at a appropriate biasing voltage. Thus, an optical shutter can be made according to the invention.

What is claimed is:

1. A method of deflecting a light beam, comprising the steps of:
   preparing a semiconductor body having a forbidden band the width of which is greater than the photon energy of light to be deflected, at least one pn junction being arranged in that area of said semiconductor body in which light deflection is desired;
   disposing said semiconductor body in the path of light to be deflected; and
   injecting carriers at a concentration of $10^{18}$ to $10^{22}$ cm$^{-3}$ into said pn junction arranged in said semiconductor body, in accordance with a desired quantity of light deflection at said pn junction, to thereby cause the light transmitted through said semiconductor body to be deflected in a desired direction.

2. A light beam deflecting device comprising:
   a semiconductor body having a forbidden band the width of which is greater than the photon energy of light to be deflected, at least one pn junction being arranged in that area of said semiconductor body in which light deflection is desired;
   at least one pair of transparent electrodes disposed opposite to each other on respective p and n type regions of said semiconductor body; and
   an electric power supply means connected to said transparent electrodes for injecting carriers at a concentration of $10^{18}$ to $10^{22}$ cm$^{-3}$ into said pn junction.

3. A light beam deflecting device according to claim 2, in which said semiconductor is one selected from the group consisting of CdS, CdF$_2$, ZnS, ZnTe and SiC.

4. A light beam deflecting device according to claim 2, in which said semiconductor body has one pair of mutually parallel principal surfaces, the junction portion of said pn junction is composed of a plurality of stripes extending mutually parallel between opposite side surfaces of said semiconductor body, and said transparent electrodes are disposed opposite to each other on respective p and n type regions of the stripe-shaped pn junctions.

5. A light beam deflecting device according to claim 2, in which said semiconductor body has one pair of mutually parallel principal surfaces, said pn junction is composed of a group of dot-shaped pn junctions arranged in matrix form composed of columns and rows of pn junctions at a plane in said semiconductor body at a predetermined depth from one of said principal surfaces thereof, and said transparent electrodes are disposed opposite to each other on respective p and n type regions of the dot-shaped pn junctions.

6. A light beam deflecting device according to claim 2 in which said transparent electrodes are composed of a plurality of first electrodes extending mutually in parallel to the p type regions of one principal surface side of said semiconductor body and a plurality of second electrodes extending mutually in parallel on the n type regions of the other principal surface side of said semiconductor body, said first and second electrodes composed of columns and rows of a matrix, respectively, to form a plurality of pn junctions at the intersecting portions of said columns and rows.

7. A light beam deflecting device according to claim 2, in which said semiconductor body has one pair of principal surfaces slanted with respect to each other.

* * * * *